(12) United States Patent
Egan et al.

(10) Patent No.: US 7,020,647 B1
(45) Date of Patent: Mar. 28, 2006

(54) UTILIZE ENCODED VECTOR INDEXING FOR DATABASE GROUPING

(75) Inventors: Randy L. Egan, Rochester, MN (US); Kevin J. Kathmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/336,488

(22) Filed: Jun. 18, 1999

(51) Int. Cl.
*G06F 17/30* (2006.01)

(52) U.S. Cl. .............................................. 707/2; 707/4
(58) Field of Classification Search ............... 707/2, 707/3, 4, 1
See application file for complete search history.

(56) References Cited

U.S. PATENT DOCUMENTS

| | | | | | |
|---|---|---|---|---|---|
| 5,394,143 | A | * | 2/1995 | Murray et al. ............... | 341/63 |
| 5,560,007 | A | * | 9/1996 | Thai ............................ | 707/3 |
| 5,706,495 | A | | 1/1998 | Chadha et al. | |
| 5,794,228 | A | * | 8/1998 | French et al. ............... | 707/2 |
| 5,799,184 | A | * | 8/1998 | Fulton et al. ............... | 707/2 |
| 5,819,256 | A | | 10/1998 | Ozhutun et al. | |
| 5,822,748 | A | | 10/1998 | Cohen et al. | |
| 5,852,821 | A | * | 12/1998 | Chen et al. ................. | 707/2 |
| 5,918,225 | A | * | 6/1999 | White et al. ................ | 707/3 |
| 5,937,401 | A | | 8/1999 | Hillegas | |
| 5,974,408 | A | | 10/1999 | Cohen et al. | |
| 6,070,164 | A | | 5/2000 | Vagnozzi | |
| 6,285,994 | B1 | * | 9/2001 | Bui et al. ..................... | 707/2 |

OTHER PUBLICATIONS

IBM AS/400 Partners in Development, "Accelerating Your Queries with Encoded Vector Indexes", http://www.as400.ibm.com/developer/bi/evi.html.

* cited by examiner

*Primary Examiner*—Hosain T. Alam
*Assistant Examiner*—Anh Ly
(74) *Attorney, Agent, or Firm*—Schmeiser Olsen & Watts

(57) ABSTRACT

An apparatus and method to significantly improve performance of certain group queries using an encoded vector index (EVI) is disclosed. An EVI provides the data necessary to generate query results for COUNT, SUM, MIN, and MAX commands that specify the one or more database fields upon which the EVI is built. Only the EVI symbol table's key count, and the one or more database fields duplicated in the EVI symbol table are necessary to generate the query results.

The key count in each EVI symbol table entry contains the number of records in the database having identical values in the EVI fields (that is, the fields upon which the EVI is built). These duplicated database values are called key values in the EVI symbol table entry. The EVI symbol table entry's key count allows quick generation of query results for COUNT and SUM commands that specify one or more EVI fields. SUM command processing of an EVI field is further facilitated by calculating a product of the key count and the key value of that EVI field. The highest or lowest key value in an EVI field provides query results for MAX or MIN commands specifying that EVI field. A HAVING operand specifying a key value delimiter on an EVI field for any of the aforementioned grouping commands is also facilitated using the EVI symbol table.

55 Claims, 7 Drawing Sheets

EVI SYMBOL TABLE — 126

| KEY VALUE | CODE | KEY COUNT |
|---|---|---|
| MN | 0 | 7 |
| ND | 1 | 7 |
| WY | 2 | 6 |

| RELATIVE RECORD # (for reference) — 230 | DATABASE FIELD (for reference) — 240 | EVI VECTOR CODE — 127 / 128 |
|---|---|---|
| 1 | MN | 0 |
| 2 | ND | 1 |
| 3 | MN | 0 |
| 4 | WY | 2 |
| 5 | MN | 0 |
| 6 | WY | 2 |
| 7 | ND | 1 |
| 8 | WY | 2 |
| 9 | MN | 0 |
| 10 | WY | 2 |
| 11 | ND | 1 |
| 12 | MN | 0 |
| 13 | ND | 1 |
| 14 | WY | 2 |
| 15 | ND | 1 |
| 16 | ND | 1 |
| 17 | MN | 0 |
| 18 | ND | 1 |
| 19 | WY | 2 |
| 20 | MN | 0 |

| USER QUERY |
|---|
| SELECT GRADE SUM(GRADE) FROM FILE GROUP BY GRADE |

127

| EVI SYMBOL TABLE | | |
|---|---|---|
| KEY VALUE | CODE | KEY COUNT |
| 2 | 0 | 9 |
| 3 | 1 | 10 |
| 4 | 2 | 6 |

330

| QUERY RESULTS | |
|---|---|
| GRADE | SUM(GRADE) |
| 2 | 2 * 9 = 18 |
| 3 | 3 * 10 = 30 |
| 4 | 4 * 6 = 24 |

FIG. 3

EVI SYMBOL TABLE 400

| LEADING KEY VALUE | SECONDARY KEY VALUE | CODE | KEY COUNT |
|---|---|---|---|
| MN | ABC | 0 | 2 |
| MN | HKA | 1 | 3 |
| MN | HNU | 2 | 2 |
| ND | ABC | 3 | 2 |
| ND | HNU | 4 | 5 |
| WY | ABC | 5 | 3 |
| WY | HKA | 6 | 3 |

| USER QUERY |
|---|
| SELECT LOCATION, DEPARTMENT, COUNT(DEPARTMENT) FROM DATABASE_FILE GROUP BY LOCATION, DEPARTMENT |

520

| QUERY RESULTS | | |
|---|---|---|
| LOCATION | DEPARTMENT | COUNT (DEPARTMENT) |
| MN | ABC | 2 |
| MN | HKA | 3 |
| MN | HNU | 2 |
| ND | ABC | 2 |
| ND | HNU | 5 |
| WY | ABC | 3 |
| WY | HKA | 3 |

FIG. 5

USER QUERY — 129

SELECT LOCATION, COUNT(DEPARTMENT)
FROM DATABASE FILE
GROUP BY LOCATION

QUERY RESULTS — 620

| LOCATION | COUNT (DEPARTMENT) |
|---|---|
| MN | 2 + 3 + 2 = 7 |
| ND | 2 + 5    = 7 |
| WY | 3 + 3    = 6 |

FIG. 6

USER QUERY — 129

SELECT LOCATION, MIN(DEPARTMENT)
FROM DATABASE FILE
GROUP BY LOCATION

QUERY RESULTS — 720

| LOCATION | MIN (DEPARTMENT) |
|---|---|
| MN | ABC |
| ND | ABC |
| WY | ABC |

| USER QUERY |
|---|
| SELECT LOCATION   COUNT(LOCATION) FROM DATABASE FILE GROUP BY LOCATION |

127

| EVI SYMBOL TABLE | | |
|---|---|---|
| KEY VALUE | CODE | KEY COUNT |
| MN | 0 | 7 |
| ND | 1 | 7 |
| WY | 2 | 6 |

820

| QUERY RESULTS | |
|---|---|
| KEY VALUE | KEY COUNT |
| MN | 7 |
| ND | 7 |
| WY | 6 |

FIG. 8

UTILIZE ENCODED VECTOR INDEXING FOR DATABASE GROUPING

BACKGROUND OF THE INVENTION

1. Technical Field

This invention generally relates to a database management system performed by computers, and more specifically relates to the optimization of structured query language (SQL) grouping queries using an encoded vector index (EVI).

2. Background Art

An index in a book facilitates locating information on a specific topic quickly and without blindly paging through the book. Database indexes provide similar benefits by providing a method to quickly locate data of interest. Without an index, a database performs a full table scan, blindly searching through every row in a database table until the target data is located. Thus, depending upon where data resides in a database table, such a scan can be a lengthy and inefficient process.

Indexed scans of database tables are more efficient than full table scans since the length of database index entries are in most cases shorter than the database table entries. Shorter entries mean that more index entries can be stored in a single computer page. Indexed scans can therefore result in a considerable reduction in the total number of computer pages that must be processed in order to locate the requested data.

While indexed scans of database tables can improve performance, the complexity of the data being scanned and of the nature of the database query still determine how effectively a query can be implemented. Different queries place differing levels of processing demands on the database in unique ways. As a result, different index types are needed to cope with a users' ever-changing workloads. One type of index is the encoded vector index (EVI), disclosed U.S. Pat. No. 5,706,495, Chadha et al., Jan. 6, 1998, Encoded-Vector Indices For Decision Support and Warehousing (hereinafter "Chadha"), which is incorporated by reference.

An encoded vector index (EVI) is a variation of the bitmap index concept. A bitmap index indicates whether a specific value exists for each row in a particular column. One bit represents each row. Thus, in the bitmap index for the value "MN" in the column "LOCATION," the nth bit equals 1 if the nth row of the data table contains "LOCATION"="MN," or 0 if that row holds a value other than "MN." An EVI serves a similar purpose, but only one index is necessary to account for all the values occurring in the column (whether they be "NY," "MN," or any other). So in an EVI on the "LOCATION" column, the nth position of the EVI contains a bit code that identifies the value of "LOCATION" in the nth row of the table. Thus, whereas a distinct bitmap index is required to map each distinct key value in a database field, only one EVI is required to represent the same information. Thus, an EVI saves computer memory by including all possible key values for a given field in one database index.

Chadha discloses a method to efficiently scan relational database information by performing bit-vector operations on EVI's, instead of performing analogous operations on the relational database table itself. Yet, the use of and dependence on relational database tables has increased dramatically during the past decade, and continues to increase. Thus, new uses of database tools, such as EVI's, are needed in order to continue to provide significant improvements in query performance; otherwise, database users will be hampered in their ability to maximize intelligent information retrieval.

DISCLOSURE OF INVENTION

According to the present invention, an apparatus and method to significantly improve performance of certain group queries using an encoded vector index (EVI) is disclosed. An EVI provides the data necessary to generate query results for COUNT, SUM, MIN, and MAX commands that specify the one or more database fields upon which the EVI is built. Only the EVI symbol table's key count, and the one or more database fields duplicated in the EVI symbol table are necessary to generate the query results. By processing the EVI symbol table in lieu of more traditional database indexes, and/or in lieu of the database table itself, query results for COUNT, SUM, MIN, and MAX commands are generated significantly faster.

The key count in each EVI symbol table entry contains the number of records in the database having identical values to the EVI fields (that is, the fields upon which the EVI is built). These duplicated database values are called key values in the EVI symbol table entry. The EVI symbol table entry's key count allows quick generation of query results for COUNT and SUM commands that specify one or more EVI fields. SUM command processing of an EVI field is further facilitated by calculating a product of the key count and the key value of that EVI field. The highest or lowest key value in an EVI field provides query results for MAX or MIN commands that specify the EVI field. A HAVING operand specifying a key value delimiter on an EVI field for any of the aforementioned grouping commands is also facilitated using the EVI symbol table.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a diagram explaining the components of an encoded vector index;

FIG. 3 is an example of a SUM command and corresponding query results obtained using an EVI symbol table;

FIG. 4 is an example of a multiple key encoded vector index;

FIG. 5 is an example of a COUNT requested for multiple levels of groupings, and corresponding query results obtained using a multiple key EVI;

FIG. 6 is an example of a COUNT of one EVI field based on a grouping of a second EVI field, and corresponding query results obtained using a multiple key EVI;

FIG. 7 is an example of a MIN command that requests the lowest alphanumeric value in one EVI field, based on a grouping of a second EVI field, and corresponding query results obtained using a multiple key EVI; and FIG. 8 is an example of a COUNT command and corresponding query results obtained using an EVI symbol table.

BEST MODE FOR CARRYING OUT THE INVENTION

Figure 1:
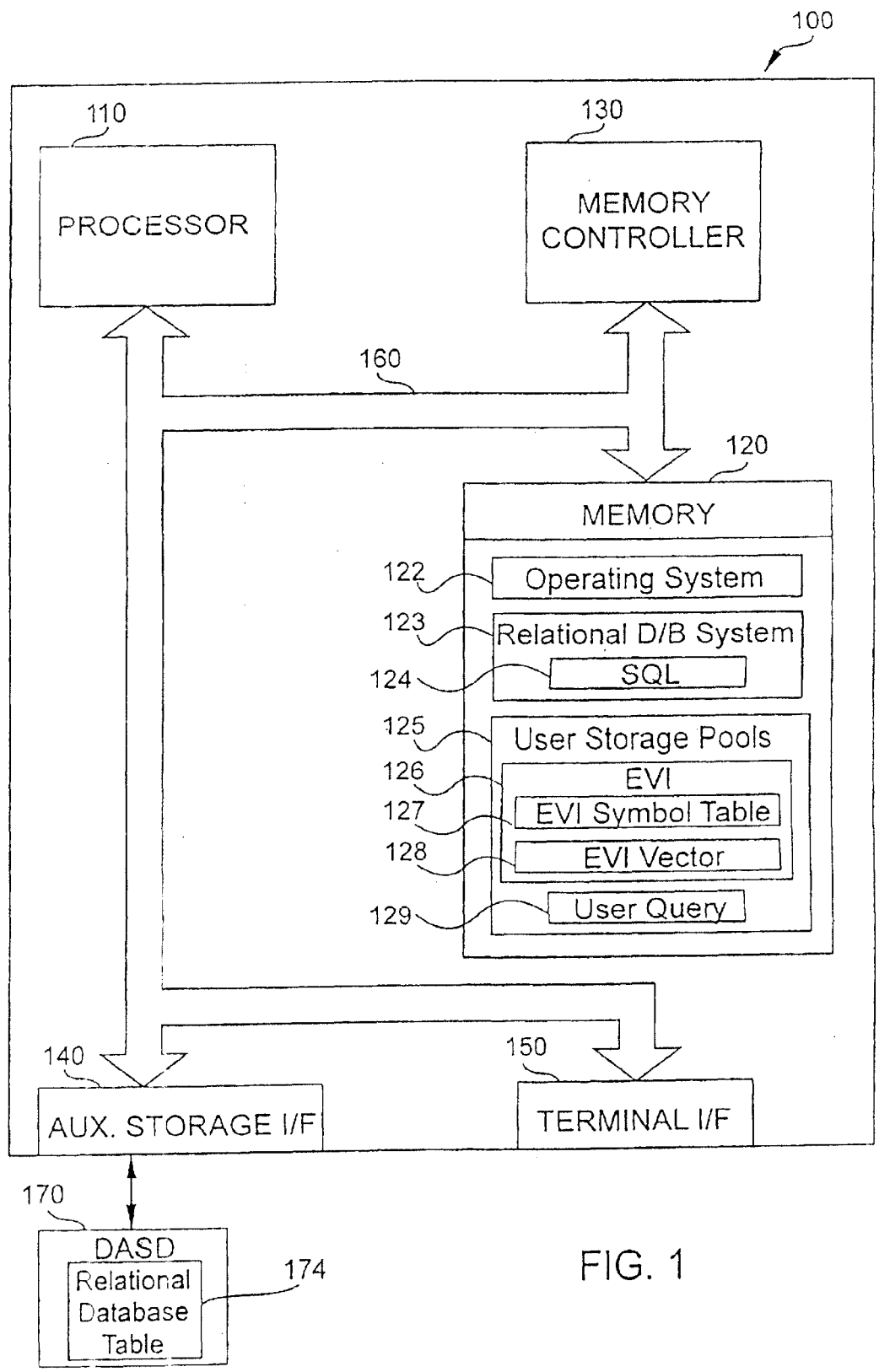
FIG. 1 is a block diagram of an apparatus according to a preferred embodiment of the present invention.

The methods of the present invention employ computer-implemented routines to query information from a database.

Referring now to FIG. 1, a block diagram of a computer system which can implement a preferred embodiment of the present invention is shown. The computer system shown in FIG. 1 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table 174 from auxiliary storage devices, such as magnetic disk (e.g., hard disks or floppy diskettes) or optical storage devices (e.g., CD-ROM). As shown in FIG. 1, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include an encoded vector index (EVI) 126, and a user query 129. EVI 126 includes an EVI symbol table 127 and an EVI vector 128. EVI 126 is a database index for a relational database table, such as relational database table 174, that is stored in DASD 170. User query 129 is a request for information from relational database table 174 stored in DASD 170. The methods of the present invention do not require that the relational database table be loaded into memory 120 to obtain the information requested in user query 129. Instead, EVI 126 is loaded into memory 120 and provides relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database tables get the information they need in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular encoded vector index (EVI) 126 exists that might scan more efficiently than the relational database housed in DASD 170. In order for an EVI to be useful to the methods of the present invention, the EVI must be built over the database fields specified in user query 129. The database fields upon which an EVI are built are called EVI fields. If an EVI with the appropriate EVI fields exists, relational database system 123 will opt to perform an indexed scan of that EVI, instead of a scan of some other traditional database index, or a scan of relational database table 174 itself.

Indexed scans of database tables are more efficient than full table scans since the index key value entries are usually shorter than the length of the database record entry. Shorter entries mean that more index entries can be stored in a single page of memory. Indexed scans can therefore result in a considerable reduction in the total number of computer pages that must be processed in order to locate the requested data.

EVI 126 is one type of database index, used to make certain types of statistical and selection queries more efficient. EVI 126 is also known as a specialized type of bitmap index. A bitmap index indicates which database rows contain a specific key value in a specific database field. The bitmap index is an array of bits, one for each row in the database table. The bit corresponding to each row is turned on or off, depending upon whether the database field contains the specific key value or not. For instance, a bitmap index may be created to indicate which rows in a database table contain a "MN" value in the "location" field. Each bit in the bitmap index that corresponds to a database row containing "MN" value in its "location" field will be turned on. The bits in the index that correspond to rows which have a location other than "MN" will be turned off. In this way, any query about the location of "MN" can be processed very efficiently.

An EVI, such as EVI 126, is structured differently than a traditional bitmap. An EVI is not limited to mapping one specific key value in a database field; instead, an EVI maps all possible key values for a given database field. The field of relational database 174 mapped by EVI 126 is called an EVI field. Sometimes, an EVI can be built over more than one database field. In this case the EVI fields include a leading EVI field, and one or more secondary EVI fields. Then, the information stored in EVI 126 is indexed first by the leading EVI field, and indexed further by one or more secondary key fields. Since some user queries request information grouped in hierarchical fashion, the leading EVI field serves to provide information for an outer grouping and one or more hierarchical secondary key fields serve to provide information for one or more hierarchical inner groupings.

Referring now to FIG. 2, a diagram explaining the components of an encoded vector index is illustrated. In this example, EVI 126 indicates which key value exists in database field 240 for each relative database record number 230. EVI 126 is made up of two tables: EVI symbol table 127, and EVI vector 128. Only the data in EVI symbol table 127 is necessary to the methods of the present invention. The other two tables illustrated in FIG. 2, relative record number 230 and database field 240, are not components of EVI 126; instead these tables are part of the relational database table and are presented as reference information to facilitate an understanding of the structure of EVI 126.

EVI symbol table 127 has an entry for each distinct key value that can be found in the database field (in this case, the LOCATION field) of the particular database for which EVI 126 is an index. Relative record number 230 and database field 240 illustrate a subset of this database. Since only three different values appear in database field 240, EVI symbol table 127 contains three rows, one for each distinct key value: "MN," "ND," and "WY." EVI symbol table 127 maintains the translation from the key value to a code, as well as the count of how many records in the database table contain the key value. Using the code field, EVI symbol table 127 can be used to decode EVI vector 128. However, the code field is not used by the methods of the present invention.

Although the information stored in EVI vector 128 is not necessary for the methods of the present invention, a discussion of its contents provides a better understanding the overall makeup of EVI 126. EVI vector 128 contains a row for every record in the database for which EVI 126 is an index. Each vector row corresponds to a database record, and contains a code for the key value contained in the EVI field. EVI vector 128 contains 20 rows, because there are 20 records in the database for which EVI 126 is an index. Each code stored in EVI vector 128 translates into the value that exists in the EVI field in the corresponding database record. The translation of the code is made possible by EVI symbol table 127. For example, for relative record number 1 in relative record number field 230, database field 240 has a "MN," which corresponds to a 0 code in EVI vector 128. By looking at EVI symbol table 127, it can be seen that code 0 equates to a key value in the EVI field of "MN."

It should be noted that EVI's are preferably built to reflect the counts of the distinct key values in one or more particular database fields, as those values exist in a database at the time that the EVI is built. Those skilled in the art of databases know that in many cases, databases are frequently updated. In order for an EVI to stay current and accurately reflect a database, the EVI must be updated whenever the value of the one or more field(s) over which the EVI is built changes. The same applies when new records are added to the database and when new records are deleted.

Changes to the relational database table can affect an EVI symbol table in two ways. First, a change to the database may require a change in key count for one or more key values that exist in the EVI symbol table. An example of this first type of change is deleting a database record, or changing a database field from one key value to a second key value that also exists in the EVI symbol table. In this first type of change, the EVI symbol table is updated by updating the key count(s) to reflect the changes made to the database fields itself, without requiring a new EVI symbol table entry.

The second type of change to a database requires a new EVI symbol table entry. An example of this type of change is when a new distinct key value is assigned to a database field, both when changing an existing database record, or when adding a new database record. When the EVI is built, the EVI symbol table's EVI fields are sorted by key value. Adding a new entry to the end of the EVI symbol table may affect the integrity of the sorted sequence of EVI symbol table entries. The EVI symbol table will then have to be rebuilt in order for all entries to be properly sorted. However, for databases that change frequently, rebuilding an EVI every time that a new EVI symbol table entry is needed can be costly and create delays in processing.

In the preferred embodiment of the present invention, the processing of EVI symbol tables accounts for the presence of unsorted EVI symbol table entries at the end of an EVI symbol table. These unsorted entries are the result of updating an EVI symbol table without rebuilding it, when changes made to the underlying database include the addition of a new distinct key value in an EVI field. As long as the software that processes an EVI symbol table accounts for unsorted EVI symbol table entries at the end of the sorted EVI symbol table entries, the integrity of an EVI symbol table can be maintained without excessive cost and processing delay. Although no unsorted EVI symbol table entries appear in FIG. 2, the processing of unsorted EVI symbol table entries will be explained further as the methods of the present invention are discussed in the forthcoming examples.

Referring back to FIG. 1, the methods of the present invention utilize EVI symbol table 127 of EVI 126 to significantly improve the performance of certain grouping queries, such as user query 129. The front-end processing by relational database system 123 determines if user query 129 is a grouping query and whether the processing of query 129 can employ EVI symbol table 127 of EVI 126 to efficiently generate query results for user query 129. An EVI symbol table provides all the necessary information to generate results for the grouping query, if the EVI symbol table has EVI field(s) that match the database field(s) specified by user query 129.

Examples of user query 129 that are supported by the methods of the present invention are grouping queries containing the SQL commands COUNT, SUM, MIN, and MAX. More detailed examples of user query 129 follow. Sometimes the processing of grouping queries is very simple, as in a request for a count of a particular value in a particular field in a particular relational database table. Other times, processing for a grouping query can be more complex, such as a request to group on multiple fields of a relational database.

Referring now to FIG. 8, an example of a COUNT command and corresponding query results obtained using an EVI symbol table is illustrated. User query 129 in FIG. 8 is an example of a simple grouping query, which requests a count of each distinct value in the EVI field (LOCATION) in a database named DATABASE_FILE. Given that there is an EVI built on the LOCATION field of the DATABASE_FILE, then the methods of the present invention can be employed by the relational database system. It should be noted that only the symbol table portion of the EVI is employed to obtain results for group queries; therefore, the EVI vector table is not shown in FIG. 8.

Instead of having to calculate a count of distinct values in the LOCATION field using other more traditional database indexes, or the DATABASE_FILE itself, EVI symbol table 127 can be used to generate the results requested by user query 129. Determining a count for each distinct key value within the LOCATION field is extremely simple using EVI symbol table 127, because the key count in each EVI symbol table entry represents the count of the records in DATABASE_FILE that have that distinct key value in the LOCATION field.

Query results 820 are obtained by scanning through EVI symbol table 127 and returning the key value and key count for each EVI symbol table entry. In this manner, the methods of the present invention generate the query results significantly faster than when traditional database indexes, or the DATABASE_FILE table itself are employed. Given that an EVI exists for the EVI field specified in the user query, results that provide a count within groupings can be returned almost instantaneously compared to other methods of processing group queries, especially for large data warehousing files.

The EVI fields in EVI symbol table 127 are sorted by key value when EVI 126 is built. When new distinct key values are added to DATABASE_FILE's LOCATION field, additional entries are added to EVI symbol table 127. Instead of rebuilding EVI 126 each time that a new EVI symbol table is added, the new unsorted entries can be added after the sorted EVI symbol table entries. The relational database system looks for unsorted EVI symbol table entries and processes them if necessary to retrieve the key value in the EVI field specified by the COUNT command in user query 129.

Referring now to FIG. 3, an example of a SUM command and corresponding query results obtained using an EVI symbol table is illustrated. The numeric database field to be summed by groupings is the GRADE field in a database named FILE. If an EVI has been built over the numeric GRADE field of the FILE database, then the relational database system can employ an indexed scan of the EVI symbol table to easily calculate the SUM requested by user query 129. It should again be noted that the EVI vector table portion of the EVI is not used to obtain results for the group queries, and therefore not shown in FIG. 3, or any of the remaining illustrations.

Query results 330 are obtained by multiplying the numeric key value in the EVI field, which corresponds to the GRADE field in the FILE database, by the key count. This product is calculated for each EVI symbol table entry. The sum of GRADES for all the database records having a 2 in the GRADE field is 18, and so on. A sum of GRADES for all values in the GRADE field is also arrived at easily, by summing together the products calculated from every EVI symbol table entry. In this example, a sum for the entire numeric GRADE field would equal 18+30+24=72. In this manner, sums can be calculated for the values in database fields without the the need to access or process the database itself.

Alternatively, if the SUM command in user query 129 has a HAVING operand, a subset of query results 330 is also arrived at easily. For instance, if a new fourth line, "HAVING GRADE>2" were added to user query 129, the relational database system calculates the sum requested from the products of the EVI symbol table entries whose key values in the EVI field for GRADE are greater than "2." The "2" specified in the HAVING operand is called a key value delimiter, and is used to delimit what subset of query results that the user is requesting.

Encoded vector indexes (EVI's) can be built over one database field, or they can be built over more than one database field. In the case of multiple EVI fields, an EVI is referred to as a multiple key EVI. The fields of such an EVI are given specialized names to distinguish them from each other. The EVI fields consist of a leading EVI field and one or more secondary key fields. Referring now to FIG. 4, an example of a multiple key encoded vector index symbol table is illustrated. The EVI, of which EVI symbol table 127 is a part, is built over two database fields, a leading EVI field and one secondary key field. Specifically, the EVI of which EVI symbol table 127 is a part is built over two fields from DATABASE_FILE. The leading EVI field is the LOCATION field and the secondary key field is the DEPARTMENT field.

It should be noted that the hierarchy of the EVI fields in a multiple key EVI is meaningful with regards to group queries. For instance, if a group query asks for a count of records for each distinct value in one EVI field (DEPARTMENT), within a grouping of another EVI field (LOCATION), the relational database system needs to translate that request into a specific leading EVI field and a specific secondary key field. In this example, the particular EVI necessary to facilitate query processing would be built on a leading EVI field of LOCATION, and a secondary key field of DEPARTMENT. An EVI with a leading EVI field of DEPARTMENT and a secondary key field of LOCATION would not be useful to the methods of the present invention.

A multiple key EVI allows many more grouping query options. For instance, a multiple key EVI can be used for a simple user query like the one presented in FIG.'s 8 and 3. The only difference in processing a multiple key EVI is that a range EVI symbol table entries is equivalent to one distinct values in an EVI leading key field, instead of one EVI symbol table entry per distinct value in an EVI field. As illustrated in FIG. 4, the first three rows of EVI symbol table 127 represent the range of EVI symbol table entries for the key value "MN." Similarly, the next two EVI symbol table entries represent the range for the key value "ND," and so on. Thus, by processing ranges of EVI symbol table entries, a simple user query can make use of multiple key EVI's.

It should be noted that even in a multiple key EVI, there is still only one EVI symbol table entry for each combination of unique key values that make up the EVI fields. Thus, as can be seen in EVI symbol table 127, there is one EVI symbol table entry for the combination of "MN" in the leading EVI field, and "ABC" in the secondary EVI field. Only for the outer groupings of EVI fields in a multiple key EVI will a range of entries equate to a distinct key value for an EVI field. For the innermost grouping, there will still be one EVI symbol table entry per distinct key value.

It should also be noted that with regards to the example above, any unsorted EVI symbol table entries must also be taken into account by the relational database system. Thus, when processing a range of EVI symbol table entries that equates to a distinct leading key value, the unsorted EVI symbol table entries with the same distinct leading key value must also be processed. In this way, the methods of the present invention can support both database tables that are warehoused and do not change, as well as database tables that change frequently. In the case of a database table that changes frequently, the EVI symbol table does not need to be rebuilt every time that a new distinct key value is added to the leading EVI field or to one of the secondary EVI fields.

A more complex grouping query is one that specifies different groupings in different operands of an SQL command. Referring now to FIG. 5, an example of a COUNT requesting multiple levels of groupings, and corresponding query results obtained using a multiple key EVI is illustrated. User query 129 is requesting the DEPARTMENT information be grouped by LOCATION first. The relational database system identifies that this request can be processed using a multiple key EVI, where the leading EVI field for user query 129 is LOCATION and the secondary key field is DEPARTMENT. To use the methods of the present invention to facilitate generating query results 520, a multiple key EVI must exist with a leading EVI field of LOCATION, and a secondary key field of DEPARTMENT. That is, a multiple key EVI with a leading EVI field of DEPARTMENT and a secondary key field of LOCATION is not an acceptable substitute. The EVI symbol table required to process user query 129 is the EVI symbol table presented in FIG. 4.

Referring now to FIG.'s 4 and 5, given that a multiple key EVI has been built over the specific leading and secondary EVI fields required for user query 129 (such as EVI symbol table 127 in FIG. 4), the methods of the present invention can be employed by the relational database system. Instead of requiring a full table scan of DATABASE_FILE to calculate counts for each DEPARTMENT within each LOCATION, the EVI symbol table 127 in FIG. 4 can be used to generate query results 520, requested by the user query 129 in FIG. 5.

Determining each sub-group of DEPARTMENT within the larger group of LOCATION is extremely simple using the EVI symbol table 127 in FIG. 4, because the combination of the leading key value and the secondary key value in each row of EVI symbol table 127 represents one sub-group. Thus, the information presented to the user will closely mimic the information in the EVI symbol table, as can be seen by comparing EVI symbol table 127 in FIG. 4, with query results 520 in FIG. 5.

The count within each sub-group represents the number of database rows that contain a particular combination of leading and secondary key values. Therefore, query results 520 are obtained by scanning through EVI symbol table 127 and returning the leading and secondary key values, and key count fields for each EVI symbol table entry. In this manner, the methods of the present invention bypass the need to access or process the DATABASE_FILE table. Given that a multiple key EVI exists for the combination of leading and secondary EVI fields specified in the grouping query, results that provide a count within sub-groupings can be returned almost instantaneously compared to other methods of processing group queries, especially for large data warehousing files.

It should be noted that if unsorted entries exist in the EVI symbol table 127 in FIG. 4, then the query results 520 in FIG. 5 may not mimic the information in the EVI symbol table exactly. The relational database system must check for unsorted entries and process them such that query results 520 will be grouped first according to LOCATION, then according to DEPARTMENT.

It should also be noted that multiple key EVI's can be built using more than two database fields. The methods of the present invention can employ multiple key EVI's built over additional secondary EVI fields both for simple and complex grouping queries. For the relational database system to determine that a multiple key EVI be used to employ the methods of the present invention requires only that the EVI fields are hierarchically organized in a manner compatible with user query 129.

Referring now to FIG. 6, an example of a COUNT of one EVI field based on a grouping of a second EVI field, and corresponding query results obtained using a multiple key EVI is illustrated. User query 620 requests a count of all DEPARTMENTS within a particular LOCATION. The relational database system identifies that this request can be processed using a mulitple key EVI, where the leading EVI field is LOCATION and the secondary EVI field is DEPARTMENT. An example of such an EVI symbol table is presented in FIG. 4. Given that a multiple key EVI exists that is hierarchically compatible to this query request, the calculation of counts requested are facilitated by the methods of the present invention.

Query results 620 requested by the user query 129 in FIG. 6 are generated by summing the counts in a range of entries in the EVI symbol table 127 in FIG. 4. To create the requested counts, the relational database system sums up the key counts from each EVI symbol table entry with the same leading key value in the leading EVI key field. Thus, a count of departments within the "MN" location is calculated by adding the key counts for the first three rows of EVI symbol table 127. In this manner, user query 129 can be processed without processing alternate database indices or the database itself The relational database system will process the range of sorted entries in the EVI symbol table, checking as appropriate for any unsorted entries that may exist at the end of the sorted entries. In this manner, the methods of the present invention can accurately process an EVI symbol table, regardless of whether all of its entries are in sorted order.

Referring now to FIG. 7, an example of a MIN command that requests the lowest alphanumeric value in one database field, based on a grouping of a second database field, and corresponding query results obtained using a multiple key EVI is illustrated. User query 129 is more complex than a simple MIN command that requests the lowest alphanumeric value in one database field. User query 129 asks for the lowest alphanumeric value in the DEPARTMENT field for each LOCATION. The relational database system identifies that this request can be processed using a multiple key EVI, whose leading EVI field is LOCATION and whose secondary EVI field is DEPARTMENT. An example of this multiple key EVI is represented by EVI symbol table 127, presented in FIG. 4. Given that the hierarchically proper EVI exists, determining the minimum values is facilitated by the methods of the present invention.

Query results 720 are generated by locating the secondary key value having the lowest alphanumeric value in all EVI symbol table entries having the same leading key value. By comparing the EVI symbol table 127 shown in FIG. 4, with the query results 720 shown in FIG. 7, it can be seen that within each LOCATION, the DEPARTMENT that has the lowest alphanumeric secondary key value is "ABC." The relational database system makes this determination by scanning the EVI symbol table 127 in FIG. 4. For each range of entries with the same LOCATION leading key value, the DEPARTMENT secondary key values are compared to determine which has the lowest alphanumeric value. Thus, by comparing the corresponding key value fields in different EVI symbol tables, the lowest and highest values can easily be determined.

User query 129 can thus be processed without any need to process other database indices, or the relational database table itself. Again it should be noted that the relational database system will process the range of sorted entries in the EVI symbol table, and then check for any unsorted entries that may exist at the end of the sorted entries. In this manner, the methods of the present invention avoid excessive costs and delays in EVI symbol table processing for EVI's that are built over database fields that change frequently.

It should be noted that the methods of the present invention can be used to process a more simple MIN or MAX grouping query as well. Referring back to FIG. 3, EVI symbol table 127 provides an example. If a user query asks for the MIN (GRADE), the relational database system can make use of EVI symbol table 127 to locate the entry which has the lowest key value. In this case, the relational database system scans the EVI symbol table sorted and unsorted entries to determine that the MIN (GRADE)=2. Alternatively, if a user query asks for the MAX (GRADE), the relational database system can make use of EVI symbol table 127 to locate the entry which has the highest key value. In this case, MAX (GRADE)=4.

The relational database system of the preferred embodiment provides efficient processing of certain SQL grouping queries by scanning an EVI symbol table. Query results for COUNT, SUM, MIN, and/or MAX commands can be returned to the relational database user without the need to invoke alternate database indexes, and without the need to load the relational database table into memory and scan the relational database table itself. Since the EVI symbol table has key counts for the key values in the EVI fields, and/or combinations of leading and secondary EVI fields, the relational database system can process the information in the fields of this table much more rapidly than through the use of other database indexes. Thus, the methods of the present invention provide the relational database system with the programming to process the EVI symbol table when doing so will provide significant savings in processing time. While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   an encoded vector index (EVI) built on at least one database field in a database, the EVI comprising a plurality of EVI symbol table entries, each EVI symbol table entry comprising a key value for each of the at least one database field, and a key count; and
   a relational database system, the relational database system processing at least one of the plurality of EVI symbol table entries to generate results for a user query, the user query specifying one of at least one database field on which the EVI is built.

2. The apparatus of claim 1 wherein:
   the user query requests a count of one of the at least one database field; and
   the relational database system generates the requested count from the key count in at least one of the plurality of EVI symbol table entries.

3. The apparatus of claim 1 wherein:
   the EVI is built on at least one numeric database field in the database; the user query requests a sum of one of the at least one numeric database field; and
   the relational database system generates the sum by calculating a product from at least one of the plurality of EVI symbol table entries, the product having the key count as one multiplicand and the key value for the one of the at least one numeric database field as the other multiplicand.

4. The apparatus of claim 1 wherein:
   the user query requests a lowest value of one of the at least one database field; and
   the relational database system returns the lowest key value in the EVI symbol table for the one of the at least one database field.

5. The apparatus of claim 1 wherein:
   the user query requests a highest value of one of the at least one database field; and
   the relational database system returns the highest key value in the EVI symbol table for the one of the at least one database field.

6. The apparatus of claim 1 wherein:
   at least one command in the user query comprises a HAVING operand, the HAVING operand specifying a key value delimiter on one of the at least one database field; and
   the relational database system employing the key value delimiter to generate a subset of results for the user query.

7. The apparatus of claim 1 wherein:
the at least one database field comprises a leading EVI field and at least one secondary EVI field; and
each EVI symbol table entry comprises a key count, a key value for the leading EVI field and a key value for each of the at least one secondary EVI fields.

8. The apparatus of claim 7 wherein the user query specifies a grouping of the leading EVI field.

9. The apparatus of claim 7 wherein the user query specifies a grouping of one of the at least one secondary EVI fields.

10. The apparatus of claim 7 wherein the user query specifies a hierarchical grouping that matches the hierarchy of the leading EVI field and the at least one secondary EVI field in the EVI symbol table.

11. An apparatus comprising:
at least one processor;
a memory coupled to the at least one processor;
an encoded vector index (EVI) built on at least one database field in a database, the EVI comprising a plurality of EVI symbol table entries, each EVI symbol table entry comprising an EVI field for each of the at least one database field and a key count, each EVI field having a key value corresponding in value to the database field, the key count having a count of records in the database whose values match the key values in the at least one EVI field; and
a relational database system, the relational database system generating results for a user query from the plurality of EVI symbol table entries, the user query comprising a SUM, COUNT, MIN, or MAX command that specifies one of the at least one EVI field in the EVI symbol table.

12. The apparatus of claim 11 wherein:
the user query comprises a MIN command that specifies one of the at least one EVI field in the EVI symbol table; and
the relational database system searches through the plurality of EVI symbol table entries, returning the lowest key value in the one of the at least one EVI field.

13. The apparatus of claim 11 wherein:
the user query comprises a MAX command that specifies one of the at least one EVI field in the EVI symbol table; and
the relational database system searches through the plurality of EVI symbol table entries, returning the highest key value in the one of the at least one EVI field.

14. The apparatus of claim 11 wherein:
one of the at least one database fields upon which the EVI is built is numeric, and each EVI symbol table entry comprises a numeric EVI field corresponding to the numeric database field, the numeric EVI field have a numeric key value corresponding in value to the numeric database field;
the user query comprises a SUM command that specifies the numeric EVI field; and
the relational database system generates a sum by calculating a product from at least one of the plurality of EVI symbol table entries, the product having the key count as one multiplicand, and the numeric key value corresponding in value to the numeric database field, as the other multiplicand.

15. The apparatus of claim 11 wherein:
the user query comprises a COUNT command that specifies one of the at least one EVI field in the EVI symbol table; and
the relational database system employs the key count from at least one of the plurality of EVI symbol table entries to generate the query results.

16. The apparatus of claim 11 wherein the user query comprises a command having a HAVING operand with a key value delimiter, and the relational database system generates a subset of query results based on the key value delimiter.

17. The apparatus of claim 11 wherein the EVI is built on a plurality of database fields in a database, and each EVI symbol table entry comprises a key count, a leading EVI field, and at least one secondary EVI field.

18. The apparatus of claim 17 wherein the user query comprises a SUM, COUNT, MIN, or MAX command that specifies a plurality of EVI fields in the EVI symbol table, the plurality of EVI fields in the user query matching the hierarchy of the leading EVI field, and the at least one secondary EVI field in the EVI symbol table.

19. The apparatus of claim 17 wherein the relational database system generates query results from a range of EVI symbol table entries that togther comprise all the records in the database whose values match the key value in the at least one EVI field.

20. A method of processing a grouping query comprising the steps of:
processing a key value in at least one EVI field in a plurality of EVI symbol table entries, the at least one EVI field specified in a grouping query; and
generating results for the grouping query from at least one of the plurality of EVI symbol table entries.

21. The method of claim 20 wherein the step of generating results for the grouping query comprises generating a subset of query results from at least one of the plurality of EVI symbol table entries, if the grouping query comprises a command with a HAVING operand that specifies a key value delimiter on one of the at least one EVI field specified in the grouping query.

22. The method of claim 20 wherein the step of generating results for the grouping query comprises generating results for a MIN command that specifies one of the at least one EVI field, by returning a lowest key value in the one of the at least one EVI field from one of the plurality of EVI symbol table entries.

23. The method of claim 20 wherein the step of generating results for the grouping query comprises generating results for a MAX command that specifies one of the at least one EVI field, by returning a highest key value in the one of the at least one EVI field from one of the plurality of EVI symbol table entries.

24. The method of claim 20:
further comprising the step of processing a key count in at least one of the plurality of EVI symbol table entries; and
wherein the step of generating results for the grouping query further comprises generating results from the key count in at least one of the plurality of EVI symbol table entries.

25. The method of claim 24 wherein the step of generating results for the grouping query comprises generating results for a COUNT command that specifies one of the at least one EVI field, by calculating a count from at least one key count in at least one of the plurality of EVI symbol table entries.

26. The method of claim 24 wherein the step of generating results for the grouping query comprises generating results for a SUM command that specifies one of the at least one EVI field, by multiplying the key count with the key value in the one of the at least one EVI field in at least one of the plurality of EVI symbol table entries.

27. A method of processing a grouping query comprising the steps of:

parsing a grouping query that comprises a COUNT, SUM, MIN, or MAX command, the command specifying at least one database field in a database;

determining at least one EVI field upon which an encoded vector index (EVI) of the database must be built, in order to employ the EVI to generate results for the command, the at least one EVI field matching the at least one database field;

locating the EVI built upon the at least one EVI field, the EVI comprising a plurality of EVI symbol table entries, each EVI symbol table entry comprising a key count and a key value for each of the at least one EVI field;

processing the key value in the at least one EVI field in at least one of the plurality of EVI symbol table entries; and generating results for the grouping query from the at least one of the plurality of EVI symbol table entries.

28. The method of claim 27 wherein:

the step of parsing further comprises identifying a HAVING operand on the command, the HAVING command specifying a key value delimiter on one of the at least one database field in the database;

the step of generating results comprises generating a subset of results for the grouping query, the subset of results specified by the key value delimiter.

29. The method of claim 27 wherein:

the step of parsing comprises parsing a grouping query that comprises a COUNT command that specifies one of the at least one database field in the database;

the step of processing further comprises processing the key count in at least one of the plurality of EVI symbol table entries; and the step of generating results comprises calculating a count from the key count in the at least one of the plurality of EVI symbol table entries.

30. The method of claim 27 wherein:

the step of parsing comprises parsing a grouping query that comprises a SUM command that specifies one of the at least one database field in the database;

the step of processing further comprises processing the key count in at least one of the plurality of EVI symbol table entries; and the step of generating results comprises multiplying the key count with the key value in one of the at least one EVI field that matches the one of the at least one database field.

31. The method of claim 27 wherein:

the step of parsing comprises parsing a grouping query that comprises a MIN command that specifies one of the at least one database field in the database;

the step of generating results comprises returning a lowest key value in the at least one EVI field from one of the plurality of EVI symbol table entries.

32. The method of claim 27 wherein:

the step of parsing comprises parsing a grouping query that comprises a MAX command that specifies one of the at least one database field in the database;

the step of generating results comprises returning a highest key value in the at least one EVI field from one of the plurality of EVI symbol table entries.

33. A program product comprising:

an encoded vector index (EVI) built on at least one database field in a database, the EVI comprising a plurality of EVI symbol table entries, each EVI symbol table entry comprising a key value for each of the at least one database field, and a key count;

a relational database system, the relational database system processing at least one of the plurality of EVI symbol table entries to generate results for a user query, the user query specifying one of at least one database field on which the EVI is built; and signal bearing media bearing the EVI and the relational database system.

34. The program product of claim 33 wherein the signal bearing media comprises transmission media.

35. The program product of claim 33 wherein the signal bearing media comprises recordable media.

36. The apparatus of claim 33 wherein:

the user query requests a count of one of the at least one database field; and the relational database system generates the requested count from the key count in at least one of the plurality of EVI symbol table entries.

37. The program product of claim 33 wherein:

the EVI is built on at least one numeric database field in the database;

the user query requests a sum of one of the at least one numeric database field; and the relational database system generates the sum by calculating a product from at least one of the plurality of EVI symbol table entries, the product having the key count as one multiplicand and the key value for the one of the at least one numeric database field as the other multiplicand.

38. The program product of claim 33 wherein:

the user query requests a lowest value of one of the at least one database field; and the relational database system returns the lowest key value in the EVI symbol table for the one of the at least one database field.

39. The program product of claim 33 wherein:

the user query requests a highest value of one of the at least one database field; and the relational database system returns the highest key value in the EVI symbol table for the one of the at least one database field.

40. The program product of claim 33 wherein:

at least one command in the user query comprises a HAVING operand, the HAVING operand specifying a key value delimiter on one of the at least one database field; and the relational database system employing the key value delimiter to generate a subset of results for the user query.

41. The program product of claim 33 wherein:

the at least one database field comprises a leading EVI field and at least one secondary EVI field; and each EVI symbol table entry comprises a key count, a key value for the leading EVI field and a key value for each of the at least one secondary EVI fields.

42. The program product of claim 41 wherein the user query specifies a grouping of the leading EVI field.

43. The program product of claim 41 wherein the user query specifies a grouping of one of the at least one secondary EVI fields.

44. The program product of claim 41 wherein the user query specifies a hierarchical grouping that matches the hierarchy of the leading EVI field and the at least one secondary EVI field in the EVI symbol table.

45. A program product comprising:

an encoded vector index (EVI) built on at least one database field in a database, the EVI comprising a plurality of EVI symbol table entries, each EVI symbol table entry comprising an EVI field for each of the at least one database field and a key count, each EVI field having a key value corresponding in value to the database field, the key count having a count of records in the database whose values match the key values in the at least one EVI field;

a relational database system, the relational database system generating results for a user query from the plurality of EVI symbol table entries, the user query comprising a SUM, COUNT, MX, or MAX command that specifies one of the at least one EVI field in the EVI symbol table; and signal bearing media bearing the EVI and the relational database system.

46. The program product of claim 45 wherein the signal bearing media comprises transmission media.

47. The program product of claim 45 wherein the signal bearing media comprises recordable media.

48. The program product of claim 45 wherein:

the user query comprises a MIN command that specifies one of the at least one EVI field in the EVI symbol table; and the relational database system searches through the plurality of EVI symbol table entries, returning the lowest key value in the one of the at least one EVI field.

49. The program product of claim 45 wherein:

the user query comprises a MAX command that specifies one of the at least one EVI field in the EVI symbol table; and the relational database system searches through the plurality of EVI symbol table entries, returning the highest key value in the one of the at least one EVI field.

50. The program product of claim 45 wherein:

one of the at least one database fields upon which the EVI is built is numeric, and each EVI symbol table entry comprises a numeric EVI field corresponding to the numeric database field, the numeric EVI field have a numeric key value corresponding in value to the numeric database field;

the user query comprises a SUM command that specifies the numeric EVI field; and the relational database system generates a sum by calculating a product from at least one of the plurality of EVI symbol table entries, the product having the key count as one multiplicand, and the numeric key value corresponding in value to the numeric database field, as the other multiplicand.

51. The program product of claim 45 wherein:

the user query comprises a COUNT command that specifies one of the at least one EVI field in the EVI symbol table; and the relational database system employs the key count from at least one of the plurality of EVI symbol table entries to generate the query results.

52. The program product of claim 45 wherein the user query comprises a command having a HAVING operand with a key value delimiter, and the relational database system generates a subset of query results based on the key value delimiter.

53. The program product of claim 45 wherein the EVI is built on a plurality of database fields in a database, and each EVI symbol table entry comprises a key count, a leading EVI field, and at least one secondary EVI field.

54. The program product of claim 53 wherein the user query comprises a SUM, COUNT, MIN, or MAX command that specifies a plurality of EVI fields in the EVI symbol table, the plurality of EVI fields in the user query matching the hierarchy of the leading EVI field, and the at least one secondary EVI field in the EVI symbol table.

55. The program product of claim 53 wherein the relational database system generates query results from a range of EVI symbol table entries that togther comprise all the records in the database whose values match the key value in the at least one EVI field.

* * * * *